(12) United States Patent
Finney et al.

(10) Patent No.: US 8,252,354 B2
(45) Date of Patent: Aug. 28, 2012

(54) MANUFACTURE OF SEED DERIVATIVE COMPOSITIONS

(75) Inventors: John M. Finney, Eden Prairie, MN (US); Christopher J. Rueb, St. Paul, MN (US); William A. Hendrickson, Stillwater, MN (US); Daniel R. Roesler, Stillwater, MN (US); Robert G. Bowman, Woodbury, MN (US); David A. Canfield, St. Paul Park, MN (US)

(73) Assignee: MAS Marketing Holding Company, LLC, Dawsonville, GA (US)

( * ) Notice: Subject to any disclaimer, the term of this patent is extended or adjusted under 35 U.S.C. 154(b) by 265 days.

(21) Appl. No.: 12/802,337

(22) Filed: Jun. 4, 2010

(65) Prior Publication Data

US 2010/0310719 A1     Dec. 9, 2010

Related U.S. Application Data

(60) Provisional application No. 61/268,178, filed on Jun. 8, 2009.

(51) Int. Cl.
*A23L 1/10* (2006.01)
(52) U.S. Cl. ........ 426/455; 426/456; 426/460; 426/464; 426/469; 426/473; 426/622
(58) Field of Classification Search ................. 426/455, 426/456, 460, 464, 469, 473, 622
See application file for complete search history.

(56) References Cited

U.S. PATENT DOCUMENTS

| | | | |
|---|---|---|---|
| 4,119,733 A | 10/1978 | Hsieh et al. | |
| 6,827,965 B1 | 12/2004 | Fitzpatrick | |
| 2004/0161524 A1 | 8/2004 | Sakai et al. | |
| 2006/0286184 A1 | 12/2006 | Nativ et al. | |
| 2008/0305190 A1 | 12/2008 | Vuksan | |
| 2009/0181127 A1* | 7/2009 | Minatelli et al. ................ | 426/63 |

FOREIGN PATENT DOCUMENTS

WO    WO99/62356    9/1999

\* cited by examiner

*Primary Examiner* — Helen F Heggestad
(74) *Attorney, Agent, or Firm* — Smith, Gambrell & Russell

(57) ABSTRACT

A method is used to separate fractions from a seed. This can be done by:
  a) Physically breaking down the Chia seed into smaller particles;
  b) Adding a liquid carrier to the broken Chia seed to form a Chia liquid carrier blend;
  c) Optionally providing further processing of the Chia liquid carrier blend to further reduce the particle size of the Chia particles
  d) Optionally centrifuging the Chia liquid carrier blend;
  e) Optionally forming at least three discernible layers of materials within the centrifuged Chia liquid carrier blend;
  f) Optionally separating the composition of at least one layer from remaining layers; and
  g) Optionally combining the separated layers together into a desired combination/ratios
  h) Drying the separated layers or combined layers into a flowable powder.

14 Claims, 8 Drawing Sheets

Figure 1(a). This is the schematic of taking whole Chia seeds and processing them as a flowable powder.

Figure 1(b). This is another schematic of taking whole Chia seeds and processing them as a flowable powder.

Figure 1(c). This is another schematic of taking whole Chia seeds and/or ground Chia seeds and processing them as a flowable powder.

Figure 2. This is the schematic of centrifuged ground Chia seed that is observed in a centrifuge tube.
Note: As the vials are placed at an angle in the centrifuge, the phase separations are also at an angle (parallel to the axis of the rotor).

Figure 3. Mean particle size of Chia seed in microns processed wet and dry via Waring blender.

Figure 4. Particle size analysis after multiple pass stone milling of Chia seed using various pre-milling preparations.

| Process | mean size (μm) |
|---|---|
| *WS wet, SM p1 | 26.9 |
| *WS wet, SM p2 | 3.65 |
| *WS wet, SM p3 | 2.6 |
| WSC, SM p1 | 17.84 |
| WSC, SM p2 | 18.76 |
| WSC, SM p3 | 7.62 |
| WS dry, SM p1 | 13.57 |
| WS dry, SM p2 | 12.37 |
| WS dry, SM p3 | 15.9 |
| DB, SM p1 | 36.34 |
| DB, SM p2 | 17.05 |
| DB, SM p3 | 14.62 |
| DB+WB, SM p1 | 22.76 |
| DB+WB, SM p2 | 14.58 |
| DB+WB, SM p3 | 8.56 |
| 7%+DB to 15% p1 | 27.18 |
| 7%+DB to 15% p2 | 11.59 |
| 7%+DB to 15% p3 | 18.5 |

Figure 5. Effects of enzyme treatment on the viscosity of black Chia seed in water (7% Chia seed w/w).

Figure 6. Viscosity of ground black Chia seed in water (7% w/w), no enzymes.

MANUFACTURE OF SEED DERIVATIVE COMPOSITIONS

RELATED APPLICATIONS DATA

This Application claims priority from U.S. Provisional Patent Application No. 61/268,178, filed 8 Jun. 2009 and titled "MANUFACTURE OF SEED DERIVATIVE COMPOSITIONS (Chia).

BACKGROUND OF THE INVENTION

1. Field of the Invention

The present invention relates to the field of agriculturally-sourced liquids, oils and aqueous solutions, derived from agricultural seed product by mechanical means. The present invention also relates to the use of the products produced by mechanical means as food for animals and humans.

2. Background of the Art

WO 99/62356 concerns enhanced food for humans which has significantly higher omega-3 content by the use of oil obtained by *Salvia hispanica*-L seed. *Salvia hispanica*-L is a summer annual belonging to the Labiate family. It originates in mountain regions extending from west central Mexico to northern Guatemala.

Published U.S. Patent Application Document No. 2006/0286184 discloses a food supplement comprising *Salvia sclarea* seeds, or flour, oil or pulp or extracts obtained from the seeds as well as finished food products comprising the food supplement. This invention further concerns a nutraceutical or cosmetic preparation comprising as an active ingredient *Salvia sclarea* seeds, or flour, oil or pulp or extracts obtained from the seeds. Various forms of processing, including cold pressing and extraction to obtain the *salvia sclarea* oil is shown. The reference specifically and generally discloses examples of manners for separating the oil that include cold press achieved by crushing and pressing the seed, centrifugation of the pressed seed for collection of the oily fraction present in the supernatant, and optionally also purification by various means known in the art such as by using filters, collecting sediments etc. This reference discusses *Salvia sclarea* and does not describe *Salvia hispanica*-L seed (e.g., a proprietary Chia seed referred to as Chaveka™ seed).

Published U.S. Patent Application 2004/0161524 describes a method for producing a liquid plant extract containing plant powder, which comprises concentrating a liquid extract containing an active ingredient in the presence of the plant powder, the liquid extract being obtained from a plant containing the active ingredient; a process for producing a plant extract containing plant powder, which is characterized by comprises concentrating and drying a liquid extract containing an active ingredient in the presence of the plant powder, the liquid extract being obtained from a plant containing the active ingredient; a liquid plant extract or plant extract containing plant powder which comprises a liquid extract or plant extract containing the active ingredient obtained from a plant containing the active ingredient and comprises plant powder, and in which the content of the active ingredient in the liquid extract or plant extract is higher than that in the plant; and a food and drink or feed to which the liquid plant extract or plant extract containing plant powder is added. There is no particular limitation as to the apparatus used for extraction, and a vessel designed for efficient extraction, a stirrer, a reflux condenser, a Soxhlet extractor, a homogenizer, a shaker, a supersonic generator, etc., may be used. The liquid extract may be treated by means of various solid-liquid separation such as sedimentation, cake filtration, clear filtration, centrifugal filtration, centrifugal sedimentation, compression separation or filter press.

Chia or *Salvia Hispanica* is an estival growing annual species belonging to the family Labiata that is indigenous to Central and South America, particularly the Rocky Mountains area extending from the Mexican western central area towards northern Guatemala. A sample of references on chia can be found in the list of references provided herein. Pre-Columbian civilizations, mainly Aztecs, used chia as a raw material for a number of applications, such as in a variety of medicinal and nutritional compounds, and in substances such as paints. Chia was extremely important to Pre-Columbian societies. From the point of view of significance, only corn and beans surpassed it.

Although chia was originally part of the South and Central American and U.S. Southwest indigenous diet, this changed with colonization and modernization. Today, Mexican Indian descendants still grow chia on a small scale using rudimentary technological methods, for preparing a popular beverage called "Chia fresca". Chia is also grown today for use as an invaluable binder in industrial compounds, such as varnish, paints and cosmetics. In U.S. Patent Application Published Document 20080305190 (Vuksan), it is reported that typical chia flour, after oil extraction (which is how it is marketed), provides the remaining chia flour with 50-60% of fiber. Chia seed possesses 5% of soluble fiber which appears as mucilage when the seed is humidified.

U.S. Pat. No. 6,827,965 (Fitzpatrick) discloses food products containing whole chia seeds or a gluten-free agglutinant derived therefrom that are made by mixing a food material with water, adding whole chia seeds or an agglutinant derived therefrom in an agglutinating amount, and reducing the water activity of the mixture. Other ingredients such as honey, syrups, and sprouted grains can also be mixed with the chia seeds. The gluten free varieties are of especial value for those individuals who are allergic to the gluten in wheat and other grains. The chia seeds may be ground, often in the presence of other ingredients for food products, using the chia seed as an agglutinant.

SUMMARY OF THE INVENTION

In the present invention we will define *Salvia hispanica*-L seed generically as "Chia seed."

Seed material having oil/liquid content, such as *Salvia hispanica*-L (e.g., a proprietary seed referred to as Chaveka™ seed) seed (Chia seed), is broken up (crushed, milled, pressed without preliminary substantive removal of liquid content), optionally added to an aqueous carrier, and optionally centrifuged to form at least three distinct layers of composition, of which optionally at least some composition is removed from the layers to provide at least three or more distinct compositions derived from the seed and there may be storage of the at least three or more separate compositions. The three or more distinct compositions may be subsequently blended or not to obtain blends of Chia seed such as Chaveka™ seed-derived compositions, and the individual compositions or blends may be dried to a powder for later rehydration or addition to other compositions (e.g., bakery mixes, beverages or the like).

BRIEF DESCRIPTION OF THE FIGURES

In the Figures, wherever Chaveka™ is used, that refers to Chaveka™ powder.

DETAILED DESCRIPTION OF THE INVENTION

For preparing a particular plant powder derived from Chia seed, the plant seed, dried (or roasted) plant seed or preferably undried plant seed, or wetted seed, is crushed with a compression crusher such as jaw crusher, gyratory crusher or cone crusher; shearing machine such as cutter mill or shredder; impact crusher such as hammer crusher; roll mill such as roll crusher; rotary mill such as disintegrator or cage mill; a high speed rotary mill such as a blender (e.g., Waring® type blender); screw mill such as coffee mill; rolling mill such as edge runner; hammering mill such as stamp mill; roller mill such as centrifugal roller mill, ball bearing mill, or bowl mill; high speed rotary mill such as swing hammer mill, pin mill, cage mill, turbo-type mill, or centrifugal mill; vessel vibrating mill such as rolling ball mill, vibrating ball mill, planetary ball mill, or CF mill; jet mill such as flow-pipe type mill, stirring tank mill, annular-type mill, air suction type mill, impact plate impact mill, or fluidized bed mill; crusher such as ultrasonic shredder; stone mortar or mortar. The product obtained by the above steps desirably must be further be processed physically to produce the Chia powder according to the present technology. That physical process is described below.

Figure 1A:
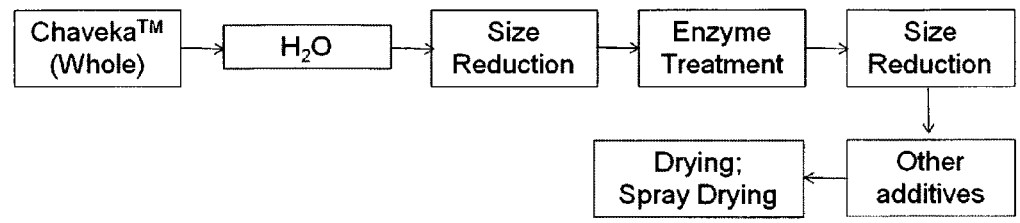
FIG. 1A shows a schematic flow diagram for a process of providing flowable Chia powder or products according to methods included within the present disclosure.
Figure 1B:
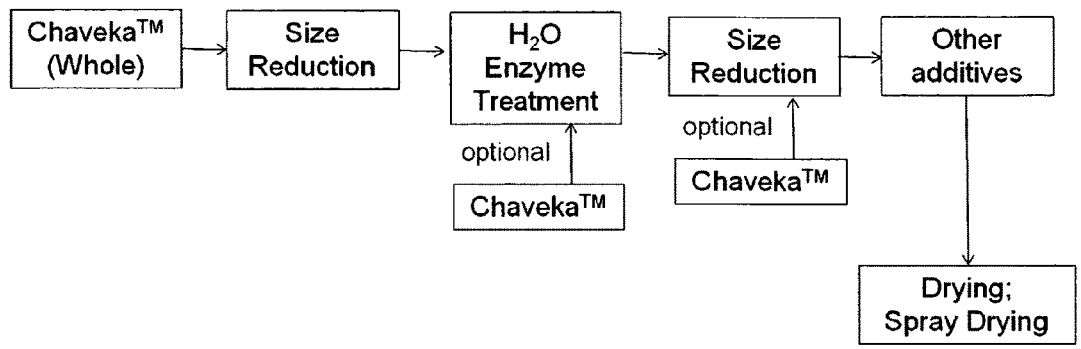
FIG. 1B shows a schematic flow diagram for a process of providing flowable Chia powder or products according to methods included within the present disclosure.
Figure 1C:
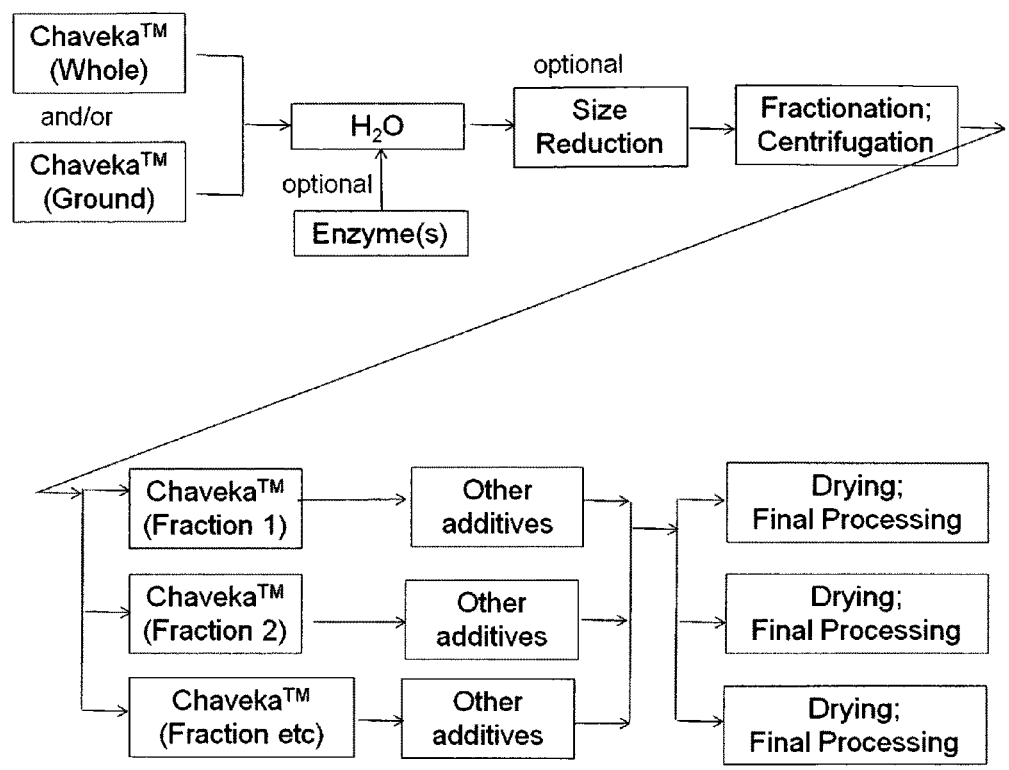
FIG. 1C shows a schematic flow diagram for a process of providing flowable Chia powder or products according to methods included within the present disclosure.
Figure 2:
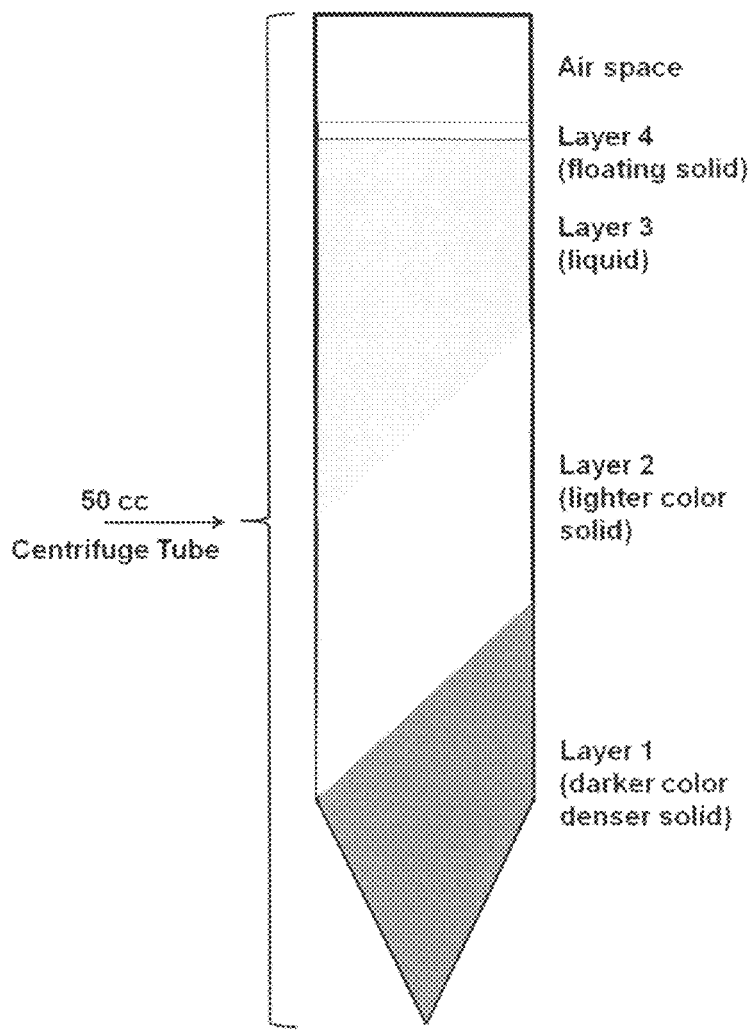
FIG. 2 shows a schematic diagram for the centrifuged processed Chia seeds.

As in FIG. 2, the crushed Chia seed material (whole seed) material, possibly with some preliminary filtration to remove solids (although not essential), is mixed with an aqueous carrier (water, deionized water, otherwise purified water, or aqueous solution with desirable additives) and is then optionally centrifuged. During centrifuging, three or more visibly and chemically distinct layers are formed. An uppermost translucent/transparent layer comprises an oily based lipid material and oil soluble nutrients. An intermediate layer, white/lightly colored layer is likely an aqueous-based solution/dispersion/emulsion of water carrying soluble nutrients and/or dispersible nutrient components of the Chia seed (and any original materials added with the aqueous carrier). A third, lowermost layer contains particulate solid nutrients such as fiber, antioxidant, from the seed testa, hilum, radical, epicotyls or hypocotyl. The three or more separate layers in the centrifuged composition are separated (into at least two compositions and preferably into compositions of the three separate layers as defined above. The three compositions are separated and either intentionally re-blended or kept separate. A selected composition of the separated/blended composition is then dried into a powder. Drying should be as gentle as possible to reduce thermally destructive damage to the components in the composition. Spray drying is a preferred method, where the compositions are separately sprayed into a chamber, preferably dry, heated chamber (e.g., With inlet temperatures between 120-480° F., 50-300° C.; and with outlet temperatures between 75-190° F., 25-95° C.) and then air dried into particles or mildly heated or dried at mild temperatures in an oven, e.g., on a conveyor belt, possibly with IR radiation to promote evaporation.

The methods described herein may be generally described as a method of separating fractions from seed, especially Chia seed. Steps in the process may include some or all:

a) Physically breaking down the Chia seed into smaller particles (e.g., the particles may be within an average diameter of about 0.1 to 1000 microns;

b) Adding a liquid carrier to the broken Chia seed to form a Chia-liquid carrier blend;

c) Optionally providing further processing of the Chia-liquid carrier blend to further reduce the particle size of the Chia particles d) Optionally centrifuging the Chia-liquid carrier blend;

e) Optionally forming at least three discernible layers of materials within the centrifuged Chia-liquid carrier blend;

f) Optionally separating the composition of at least one layer from remaining layers; and g) Optionally combining the separated layers together into a desired combination/ratio of at least two of the separated layers.

h) Drying the separated layers or combined layers into a flowable powder.

The three or more separate discernible layers may be separated into three or more compositions and at least two of the compositions are dried to form flowable powder, either separately or as blend of at least to of the compositions. At least two flowable powders from the dried at least two compositions may be blended together in proportions different from proportions found in the Chia-liquid carrier blend. The dried powder or blended dried powder may be blended into a potable liquid and the blended potable liquid is consumed by an animal, or the dried powder may be blended into a food composition and used as a food additive in the composition. The food compositions may be eaten as a blend, either as a solid, gel, liquid or cooked composition (e.g., baked, fried, broiled, steamed, etc.).

The average particle size of the plant powder is preferably 0.1 μm to 1.0 mm, more preferably 1 to 100 μm, and particularly 2 to 50 μm in a dry state, though there is no particular limitation as long as they are fine particles, and there may be significant deviations among the particles.

Initial Observations of Chia Seed (*Salvia hispanica*-L Seed).

Black Chia; lot #1SN PN122 CF4.04.07. Seeds are flexible when using a mortar and pestle to break them—i.e., they do not easily fracture or form a paste. When added to water, whole seeds swell, quickly developing a high viscosity gelatinous layer around each seed in a very short time. As a result, hydrated Chia seeds are prone to sticking to equipment, clothes, glassware, etc.

Initial experiments using U.S. Pat. No. 4,119,733 as a guide for grinding. U.S. Pat. No. 4,119,733 describes soybean beverages that are prepared by grinding, but does not describe grinding or processing *Salvia hispanica*-L seeds.

EXAMPLE 1

Grinding Using Waring Blender

A 2 L Waring blender was operated at low speed for 20 seconds in order to grind 150 g of black Chia seed.

EXAMPLE 2

Two liters of DI H$_2$O were heated to 85° C. and stirred before adding the ground Chia seed from EXAMPLE 1. A dramatic increase of viscosity was evident within the initial five minutes and appeared to build for an additional 15 minutes. The temperature was held between 77° C. and 85° C.; after 30 minutes the viscosity was estimated to be 1,000-2,000 cps and the mixture was mucilage-like with particulates. An ice bath was used to cool the material before refrigeration.

EXAMPLE 3

Figure 3:
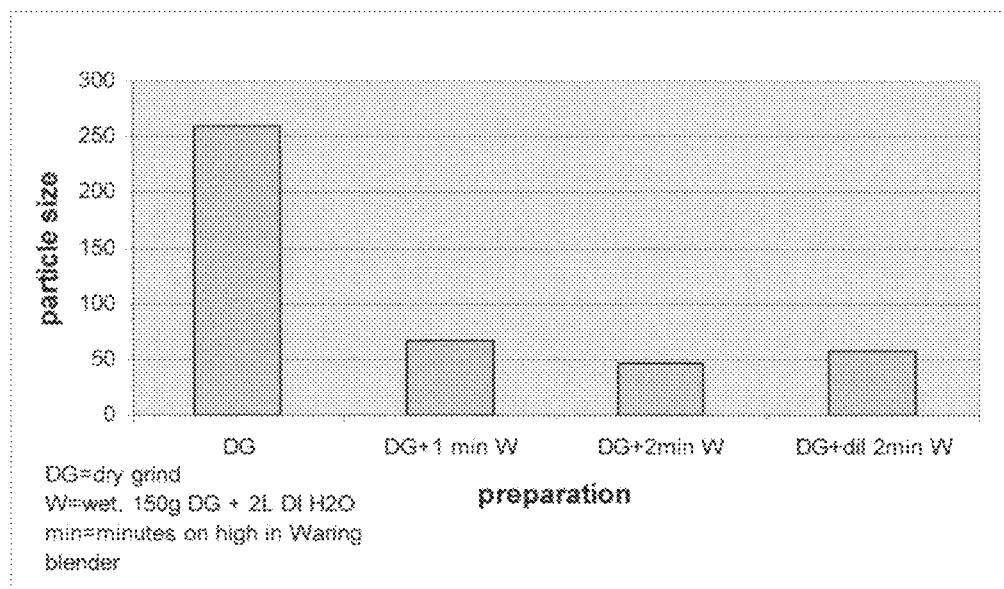
FIGS. 3-4 are graphical representations of Tables 1-3.

In the interest of minimizing particle size, the EXAMPLE 2 was repeated but the chia seeds were ground in the Waring blender on low speed for 20 s for three separate steps (scraping down the wall between steps); totaling 60 seconds. After adding the ground material to 85° C. DI H$_2$O then cooling, a 350 g portion of the wet Chia material was then processed in the Waring blender for one or two minutes on high. In addition, 150 g of DI H$_2$O was added to 350 g of the above "material base" and also processed in the Waring blender on high for two minutes. The PSD (mean Particle Size Distribution) for the dry ground material was 259 μm, while the PSD's for the wet materials ranges from 46 μm to 67 μm. See FIG. 3 and Table 1.

Table 1. Mean particle size of Chia seed processed wet and dry via Waring blender. DG=dry grind (20 s*3 times in 2 qt Waring blender on low); W=wet blend, 150 g Chia+2 L DI H$_2$O; min=minutes ground on high in Waring blender; dil=350 g wet diluted with 150 g DI H2O

EXAMPLE 4

Initial Use of Chiain Prepared Foods

Fresh Chia material was prepared by processing 150 g of whole black Chia seed (lot #1SN PN122 CF4.04.07) in a 2 qt Waring blender by blending for 20 s on low followed by a scrape-down. The material was blended and scraped-down an additional two times (i.e., total blend time=1 min). This course blended material was added to 2 L of 85° C. DI H$_2$O and stirred for 30 min; subsequently an ice bath was used to cool the liquid. The total seed material in solution/suspension was approximately 7%. Three hundred fifty grams of the Chia material was further dry blended for two minutes on high.

EXAMPLE 5

One cup of the material from EXAMPLE 4 was combined with an equal part of DI H$_2$O then added to one package of Jell-O® brand chocolate pudding and mixed for ~1.5 minutes on setting "8" using a Kitchen Aid® mixer with a whisk attachment. The mixed material was poured into 100 mL tripour containers, covered with aluminum foil, and refrigerated.

EXAMPLE 6

One cup of the material from EXAMPLE 4 was combined with an equal part of DI H$_2$O then added to one package of Jell-O® brand chocolate pudding and mixed for ~1.5 minutes on setting "8" using a Kitchen Aide mixer with a whisk attachment. The mixed material was poured into 100 mL tripour containers, covered with aluminum foil, and refrigerated.

COMPARATIVE EXAMPLE 1

An identical sample of pudding was also produced using commercial soy milk. Silk® (un-sweetened soymilk).

Pudding Results

Pudding made from the Chia product in EXAMPLES 5 and 6 appeared to set while the soymilk pudding (CE 1) did not set. Raw Chia flavor was evident in the product in EXAMPLES 5 and 6.

It is important to note that the relatively high viscosity of the Chia material was advantageous in this particular food.

EXAMPLE 7

Seventeen grams of EXAMPLE 1 was added to Betty Crocker Fiber 1 Apple Cinnamon muffin mix and the product was made as per instructions on the package.

EXAMPLE 8

Chia liquid like that produced in EXAMPLE 4 (except that the ground chia was added to room temperature water) was added to Betty Crocker Fiber 1 Apple Cinnamon muffin mix in place of the water. In particular, ¾ cup of a 7% solids ground Chia in room temperature water was used in place of the water. Otherwise, the muffins were prepared according to the directions on the box.

EXAMPLE 9

Chia liquid like that produced in EXAMPLE 4 was added to Betty Crocker™ or necessary in this area? Fiber 1 Apple Cinnamon muffin mix in place the water, i.e. ¾ cup of a 7% solids ground Chia in 85° C. water (cooled to room temperature) was used in place of the water. Otherwise, the muffins were prepared according to the directions on the box.

Muffin Results

The Chia muffin mixes produced in EXAMPLES 7-9 had no detectable off flavor, odor, color, or any apparent adverse affects on texture.

Grinding Using Stone Mill for Additional Particle Reduction of Chia Seed-Stone Mill Although a mean particle size of 46 μm has been achieved (see FIG. 3, Table 1), it is desirable to further reduce the particle size of whole Chia seed for applications such as spray drying, downstream separation, and for the production of vegetable milk.

EXAMPLES 10-15

Figure 4:
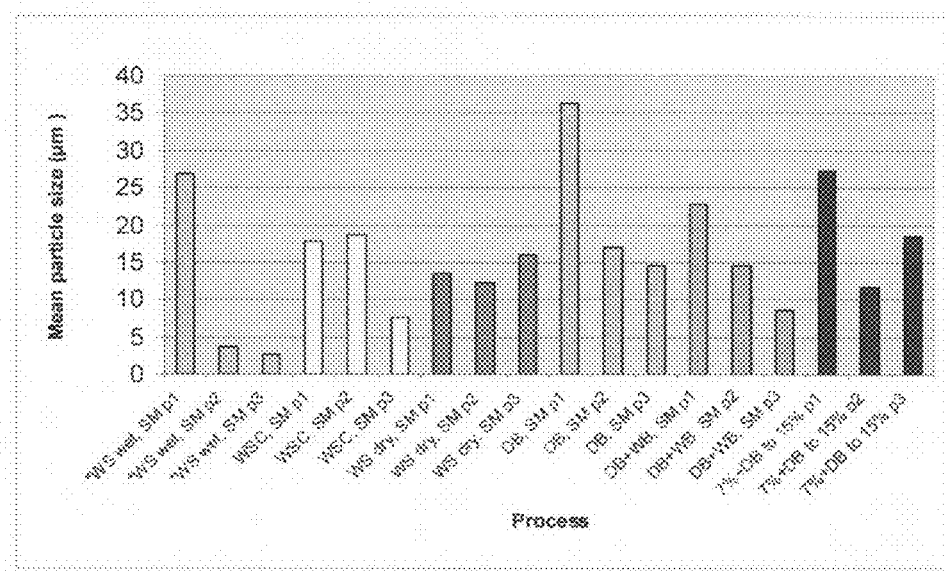

A stone mill was used in a number of trials to further reduce the particle size of a variety of Chia materials. Each trial (SM.01.0x-SM.06.0x) was based on earlier work that had used 150 g of Chia seed per 2 L of DI H$_2$O, resulting in ~7% Chia seed liquid (w/w). Six trials were performed and each preparation was fed through the stone mill for a total of three passes (i.e. SM.0y.01, SM.0y.02, and SM.0y.03). In general, the PSD mean was reduced by subsequent passes. However there was an exception; Trial SM.03.0x, where dry whole seeds and DI H$_2$O were proportionally fed into the stone mill, did not appear to have a reduction in mean particle size as the material made subsequent passes. Surprisingly, the feed material to achieve the minimum mean particle size was the 7% whole seed in ambient DI H$_2$O. Other preparations which included heating, dry and wet processing via a Waring blender, did not appear to reduce the particle size as effectively as trial SM.01.0x. See FIG. 4, Table 2 and Table 3.

TABLE 2

Stone milling: Chia feed material preparation by trial number.

| Trial # | Infeed preparation |
|---|---|
| Example 10SM01.0x | 150 g whole seed added to 2 L of ambient DI H2O |
| Example 11SM02.0x | 150 g whole seed added to 2 L 85 C. of DI H2O and held for 30 min, cooled before milling |
| Example 12SM03.0x | First pass = whole dry seeds and DI H2O poured into stone mill in separate streams at proper proportions |
| Example 13SM04.0x | 150 g dry seeds blended on low for 20 s*3 then added to 2 L DI H2O |
| Example 14SM05.0x | Above dry blended liquid further blended by Waring for 2 min. on high |
| Example 15SM06.0x | Dry blended seed added to above liquid in order to increase seed material to 15% (w/w) |

TABLE 3

Mean particle size of various preparations of Chia material after n passes through stone mill.

| Process | mean size (μm) |
|---|---|
| *WS wet, SM p1 | 26.9 |
| *WS wet, SM p2 | 3.65 |
| *WS wet, SM p3 | 2.6 |
| WSC, SM p1 | 17.84 |
| WSC, SM p2 | 18.76 |
| WSC, SM p3 | 7.62 |
| WS dry, SM p1 | 13.57 |
| WS dry, SM p2 | 12.37 |
| WS dry, SM p3 | 15.9 |
| DB, SM p1 | 36.34 |
| DB, SM p2 | 17.05 |
| DB, SM p3 | 14.62 |
| DB + WB, SM p1 | 22.76 |
| DB + WB, SM p2 | 14.58 |
| DB + WB, SM p3 | 8.56 |
| 7% + DB to 15% p1 | 27.18 |
| 7% + DB to 15% p2 | 11.59 |
| 7% + DB to 15% p3 | 18.5 |

DB = dry blend (150 g seed for 60 s (three 20 s bursts) on low in Waring 2 qt blender)
WB = wet blend (Waring blender on high for two minutes)
SM = stone mill
p(n) = number of passes through stone mill
WSC = whole seed cooked (whole seeds cooked in DI H2O at 85 C. for 30 min)
WS = whole seed
X% = percent total solids Chia seed
*stone gap decreased for each subsequent pass

EXAMPLE 16

Use of Enzymes

Addition of Bioprotease AP Enzyme

A stainless steel vessel was filled with 2 kg of DI H$_2$O and 11.02 g of 1.0M HCl to the water. Next DI H$_2$O was added to bring the total to 3.0 kg of liquid. Using a waterbath, the temperature of the water was raised to 60° C. (the liquid was stirred using large 4 blade impeller; Caframo BCD6015). The pH of the hot water was measured and recorded. An additional 11.00 g1.0M HCl was then added to mixture.

The whole black chia seed was prepared as follows: Add ~250 g of Chia seed to 2 qt Waring™ blender; blend on low for 20 seconds; scrape down sides. Repeat this procedure two additional times (therefore total blend time of 60 seconds)

The pH of the DI H$_2$O (60° C.) after adding 11.02 g of 1.0M HCl was ~2.0; however, the pH increased to ~5.0 after the Chia seed addition. An additional ~11 g of HCl was added, and although the pH changed little, the viscosity of the solution appeared to be reduced.

Add 225 g of Waring™ blended Chia seed to the 60° C. water. After five minutes measure and record the pH and retrieve a small (4 oz jar) sample. Add 0.0975 g of Bioprotease AP enzyme to the 60° C. liquid and, continue stirring for one hour and then cool the sample to room temperature before refrigerating.

Stone milling of whole Chia seed was done after addition of the Bioprotease AP enzyme. The lowered viscosity of the material apparently facilitated the separation of the seeds from the continuous phase, resulting in a large amount of whole seeds remaining in the stone mill. Therefore, additional work focused on using a Waring blender to (dry) pre-grind the seeds.

EXAMPLE 17

Addition of Biocellulase FG2 Enzyme

In a stainless steel vessel, 3 kg of DI H$_2$O was added. Using a waterbath, the water was brought to 60° C. Next was added DI H$_2$O in order to bring the total to 3.0 Kg of liquid. Using a waterbath, the water was brought to 60° C. (stir water using large 4 blade impeller; Caframo BCD6015). The pH of the hot water was measured and recorded.

The next grind of the (black) Chia seed was performed using a Waring blender as follows: ~250 g of Chia seed was added to a 2 qt Waring blender; blended on low for 20 seconds; and the sides were scraped down. Repeat this two additional times (therefore a total blend time of 60 seconds)

225 g of blended Chia seed were added to the hot water. After five minutes, the pH was measured and recorded and a small (4 oz jar) sample was separated. 0.325 g of Biocellulase FG2 concentrate was added. Continue stirring for one hour and then cool the sample before refrigerating.

Stone milling of whole Chia seed was done after addition of Biocellulase FG2 enzyme. The lowered viscosity of the material apparently facilitated the separation of the seeds from the continuous phase, resulting in a large amount of whole seeds remaining in the stone mill. Therefore, additional work focused on using a Waring blender to (dry) pre-grind the seeds.

EXAMPLE 18

Addition of Bioprotease Ap+Biocellulase FG2 Enzymes

In a stainless steel vessel was added approximately 2 kg of DI H$_2$O. Then 11.02 g of 1.0M HCl was added to the water. Next was added DI H$_2$O in order to bring the total to 3.0 Kg of liquid. Using a waterbath, the water was brought to 60° C. (stir water using large 4 blade impeller; Caframo BCD6015). The pH of the hot water was measured and recorded.

Next (black) Chia seed was ground using a Waring blender as follows: Add ~250 g of Chia seed to 2 qt Waring blender; blend on low for 20 seconds; scrape down sides. Repeat this two additional times (therefore blended a total blend time of 60 seconds)

225 g of blended Chia seed was added to the 60° C. water. After five minutes, the pH was measured and recorded and a small (4 oz jar) sample was taken. Add 0.0975 g of Bioprotease AP enzyme and then add 0.325 g of Biocellulase FG2 concentrate. Stirring was continued for one hour and then cool the sample before refrigerating. Stone milling of whole Chia seed was done after addition of Bioprotease AP and Biocellulase FG2 enzymes. The lowered viscosity of the material apparently facilitated the separation of the seeds from the continuous phase, resulting in a large amount of whole seeds remaining in the stone mill. Therefore, additional work focused on using a Waring blender to (dry) pre-grind the seeds.

Results of Addition of Enzyme(s)

Figure 5:
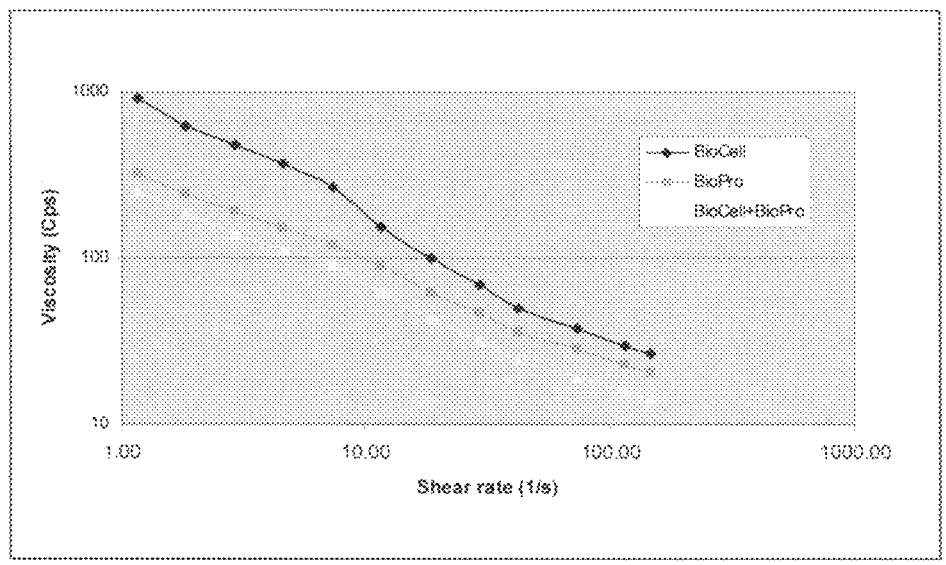
FIG. 5 is a graphical visualization of the viscosity of various treatments of ground Chia seeds.
Figure 6:
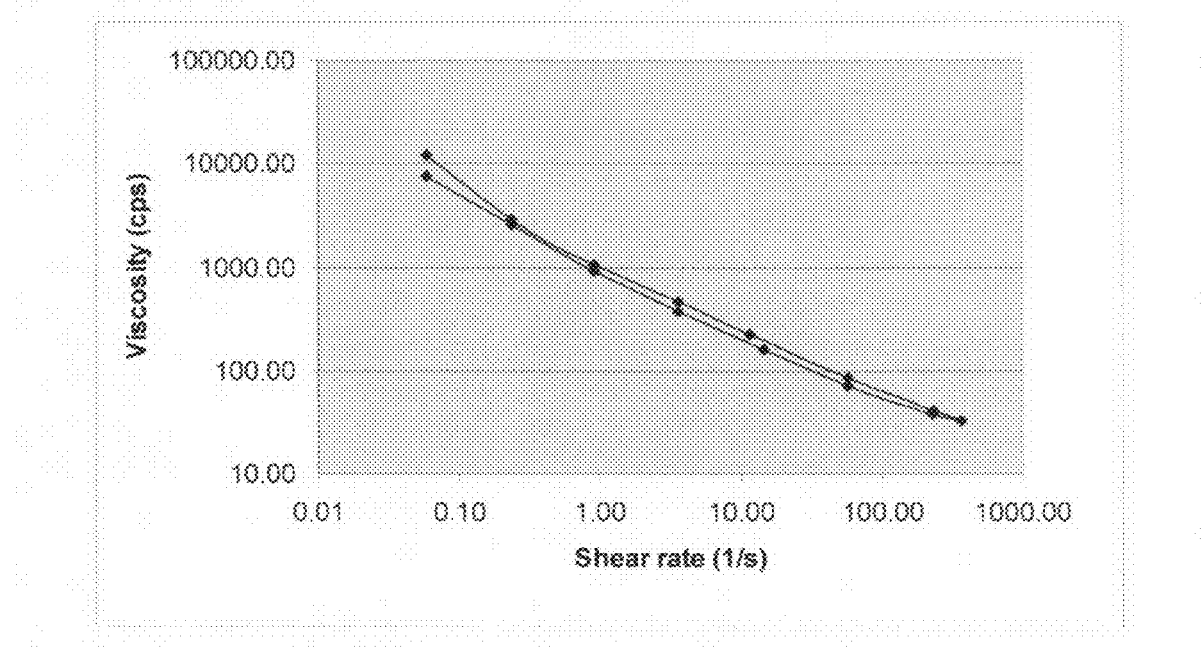
FIG. 6 is a graphical visualization of the viscosity of various treatments of ground Chia seeds.

It appears that the enzyme(s) reduce the viscosity of a Chia seed in water solution/suspension particularly those containing bioprotease AP. See FIG. 5 for viscosity data of the Bioprotease AP, Biocellulase FG2, and Bioprotease AP+Biocellulase FG2 enzyme additions and FIG. 6 for no enzyme treatment.

EXAMPLE 19

Grinding Additives

The Chia seed was ground in the Waring blender with a grinding aid to adsorb any oil expelled by the Chia during grinding similar to EXAMPLE 1.

To 142.5 g of Chia seeds was added 7.5 g of ground oat fiber. This material was stored in the freezer (−20° C.) prior to use and then was ground in the 2 L Waring Blender for 60 sec on high (in 20 second intervals).

The ground material with the ground oat fiber additive appeared to flow better than Chia without any grinding aids. The oat fiber could add fiber to the ground Chia seed.

EXAMPLE 20

The Chia seed was ground in the Waring blender with a grinding aid to adsorb any oil expelled by the Chia during grinding similar to EXAMPLE 1.

To 142.5 g of Chia seeds was added 7.5 g of ground corn bran. This material was stored in the freezer (−20° C.) prior to use and then was ground in the 2 L Waring Blender for 60 sec on high (in 20 second intervals).

The ground material with the ground corn bran appeared to flow better than Chia without any grinding aids. The corn bran could add fiber or nutrients to the ground Chia seed.

EXAMPLE 21

The Chia seed was ground in the Waring blender with a grinding aid to adsorb any oil expelled by the Chia during grinding similar to EXAMPLE 1.

To 142.5 g of Chia seeds was added 7.5 g of AS-2 phytosterol. This material was stored in the freezer (−20° C.) prior to use and then was ground in the 2 L Waring Blender for 60 sec on high (in 20 second intervals).

The ground material with the AS-2 phytosterol additive appeared to flow better than Chia without any grinding aids. The AS-2 phytosterol could add fiber or nutrients to the ground Chia.

EXAMPLE 22

The Chia seed was ground in the Waring blender with a grinding aid to adsorb any oil expelled by the Chia during grinding similar to EXAMPLE 1.

To 147 g of Chia seeds was added 3 g of precipitated silica. This material was stored in the freezer (−20° C.) prior to use and then was ground in the 2 L Waring Blender for 60 sec on high (in 20 second intervals).

The ground material with the silica additive appeared to flow better than Chia without any grinding aids.

EXAMPLE 23

Centrifugation of Ground Chia Seed

A Waring™ 2 quart blender was used to grind 150 g of whole black Chia seed. The blender was operated on low for three consecutive 20 s bursts with the powder being scraped down from the walls of the vessel between bursts. The ground material was added to 85° C. DI $H_2O$ and mixed for approximately 30 minutes. After cooling, the (now liquid) material was again placed in the Waring blender in 350 g batches and ground on high for 2 min. The ground Chia material was then added to several 45 mL centrifugation vials and centrifuged at an indicated 6,000 rpm for 30 minutes using an IEC international centrifuge, model CS.

After centrifugation, several layers were apparent as in FIG. 2. A dark material (likely insoluble, larger particle size, higher density fractions of the seed) was at the bottom of the vial [layer 1 in FIG. 2]. A second layer [Layer 2 in FIG. 2] was a relatively large volume of light colored ("white layer") material with thin yogurt-like consistency. A third layer [Layer 3 in FIG. 2] was a slightly turbid liquid. Upon the third liquid layer was a fourth layer [Layer 4 in FIG. 2] which was a "whitish" layer, with a small amount of white material floating at the surface. Note: As the vials are placed at an angle in the centrifuge, the phase separations are also at an angle (perpendicular to the axis of the rotor). Each layer was individually pipetted out separated and collected. This separation allows different fractions of the layers to be remixed in any/all ratios desired for benefit of nutrition, handling, or other needs.

EXAMPLE 24

Additional Chia material was prepared as above but was further processed by stone milling (to further reduce the particle size). After centrifugation, the previously described "white" layer was relatively dark [Layer 2 in FIG. 2]. It was apparent that the reduction of particle size decreased the efficacy of centrifugation, which is consistent regarding the function of particle size and the viscosity of the continuous phase (i.e. per Stokes law smaller particles settle at a lower rate than larger particles in a continuous phase of equal viscosity).

EXAMPLE 25

Spray Drying of Black Chia Seed

Two hundred grams of whole black Chia seed was added to 1800 g of DI $H_2O$ and stirred until dispersed. This was repeated in two additional stainless steel vessels, therefore generating a total of 6 kg of wet material. All of the Chia seed was soaked for <10 min before making a single pass through a stone mill. The stone milled Chia liquid was then spray dried using a two fluid nozzle with 30 psi atomization and inlet and outlet temperatures of 225° C. and 90° C., respectively and was fed at a rate of ~65 g/min. The resulting yield of dried material was 138.1 g with an additional amount of the scrape-down of 234.4 g. The material had excellent flow properties.

Although specific equipment, specific concentrations and other specific details have been provided in this description, the intent of the disclosure is to instruct and enable generic concepts within the broadest scope of the language of the claims.

What is claimed:

1. A method of separating fractions from a Chia seed comprising:
   i. Physically breaking down the Chia seed into smaller particles;
   ii. Adding a liquid carrier to the broken Chia seed to form a Chia liquid carrier blend;
   iii. centrifuging the Chia liquid carrier blend;
   iv. forming at least three discernible layers of materials within the centrifuged Chia liquid carrier blend;
   v. separating at least some of the composition of at least one of the three discernable layers from at least two remaining discernable layers; and
   vi. combining the separated layers together into a desired combination/ratios
   vii. drying the separated layers or combined layers into a flowable powder.

2. The method of claim 1 wherein the seed consists essentially of Chia seed.

3. The method of claim 2 wherein the average number average particle size diameter of smaller particles during centrifuging is between 0.1 and 1000 microns.

4. The method of claim 2 wherein the three or more separate discernible layers are separated into three or more compositions and at least two of the compositions are dried to form flowable powder.

5. The method of claim 4 wherein the dried powder is blended into a potable liquid and the blended potable liquid is consumed by an animal.

6. The method of claim 5 wherein at least two of the different dried particles are blended together in proportions different from those existing in total comparative proportions of those two particles existing in the Chia seed.

7. The method of claim 4 wherein the average number average particle size diameter of smaller particles during centrifuging is between 1.0 and 100 microns.

8. The method of claim 4 wherein at least two flowable powders from the dried at least two liquid compositions are blended together in proportions different from proportions found in the Chia liquid carrier blend.

9. The method of claim 8 wherein the average number average particle size diameter of smaller particles during centrifuging is between 1.0 and 100 microns.

10. The method of claim 8 wherein at least two of the different dried particles are blended together in proportions different from those existing in total comparative proportions of those two particles existing in the Chia seed.

11. The method of claim 10 wherein the average number average particle size diameter of smaller particles is reduced by at least 5% during step iii and during centrifuging the number average particle size is between 1.0 and 100 microns.

12. The method of claim 8 wherein the blended dried powder is further blended into a potable liquid and the blended potable liquid is consumed by an animal.

13. The method of claim 12 wherein at least two of the different dried particles are blended together in proportions different from those existing in total comparative proportions of those two particles existing in the Chia seed.

14. A method of separating fractions from a chia seed comprising:
   i. Physically breaking down the Chia seed into smaller particles;
   ii. Adding a liquid carrier to the broken Chia seed to form a Chia liquid carrier blend;
   iii. providing further processing of the Chia liquid carrier blend to further reduce the particle size of the Chia particles
   iv. centrifuging the Chia liquid carrier blend;
   v. forming at least three discernible layers of materials within the centrifuged Chia liquid carrier blend;
   vi. separating at least some of a composition of at least one discernable layer from remaining layers; and
   vii. combining the separated layers together into a desired combination/ratios
   viii. drying the separated layers or combined layers into a flowable powder.

* * * * *